(12) United States Patent
Minoshima

(10) Patent No.: US 7,559,563 B2
(45) Date of Patent: Jul. 14, 2009

(54) SUSPENSION APPARATUS FOR VEHICLE

(75) Inventor: Harumi Minoshima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 351 days.

(21) Appl. No.: 11/451,459

(22) Filed: Jun. 13, 2006

(65) Prior Publication Data

US 2007/0001417 A1 Jan. 4, 2007

(30) Foreign Application Priority Data

Jun. 27, 2005 (JP) ............................. 2005-186070

(51) Int. Cl.
*B60G 21/055* (2006.01)
(52) U.S. Cl. .................... 280/124.106; 280/124.166
(58) Field of Classification Search ......... 280/124.106, 280/124.107, 124.137, 124.149, 124.152, 280/124.162, 124.166
See application file for complete search history.

(56) References Cited

U.S. PATENT DOCUMENTS

| | | | | |
|---|---|---|---|---|
| 3,003,758 A | * | 10/1961 | Francis | .................... 267/34 |
| 3,575,441 A | * | 4/1971 | Arning et al. | ......... 280/124.107 |
| 4,261,591 A | * | 4/1981 | Warne, Jr. | .............. 280/124.13 |
| 5,749,596 A | * | 5/1998 | Jensen et al. | .......... 280/124.166 |
| 6,179,310 B1 | * | 1/2001 | Clare et al. | ............ 280/124.159 |
| 6,457,730 B1 | * | 10/2002 | Urbach | ................ 280/124.161 |
| 6,520,510 B1 | * | 2/2003 | Germain et al. | .......... 280/5.511 |
| 2003/0122336 A1 | * | 7/2003 | Zadok | ................. 280/124.106 |

FOREIGN PATENT DOCUMENTS

| | | |
|---|---|---|
| DE | 1 755 637 | 12/1971 |
| JP | 64-28017 | 1/1989 |
| JP | 7-257143 | 10/1995 |
| JP | 7-266834 | 10/1995 |

* cited by examiner

*Primary Examiner*—Faye M. Fleming
*Assistant Examiner*—Laura Freedman
(74) *Attorney, Agent, or Firm*—Oblon, Spivak, McClelland, Maier & Neustadt, P.C.

(57) ABSTRACT

A suspension apparatus for a vehicle includes a stabilizer bar, a hydraulic cylinder, a lever, and a link. The stabilizer bar has a torsion bar portion assembled to an axle. One arm portion of the stabilizer bar is assembled to the frame via the hydraulic cylinder and the lever. The hydraulic cylinder is assembled to the frame at a first connection point on the cylinder body. The lever is connected at a second connection point to the arm portion, is connected at a third connection point to the link, and connected at a fourth connection point to the piston rod. The link is connected at a fifth connection point to the cylinder body. The intersection between a straight line passing through the first and second connection points and a straight line passing through the third and fifth connection points is located near the axis of the piston rod.

13 Claims, 2 Drawing Sheets

FRONT OF VEHICLE

SUSPENSION APPARATUS FOR VEHICLE

BACKGROUND OF THE INVENTION

1. Field of the Invention

The present invention relates to a suspension apparatus for a vehicle (hereinafter referred to as a "vehicle suspension apparatus"), and more particularly to a vehicle suspension apparatus which can control stiffness of a stabilizer bar.

2. Description of the Related Art

Japanese Patent Application Laid-Open (kokai) No. H7-257143 disclose a conventional vehicle suspension apparatus of such a type in which one of arm portions of a stabilizer bar is connected to a piston rod of an oil-hydraulic cylinder via a lever. In the vehicle suspension apparatus disclosed in the publication, one arm portion of the stabilizer bar to which the lever is connected is assembled to a frame, which is a portion of the vehicle body, via the oil-hydraulic cylinder; the other arm portion is assembled to the frame via a stabilizer link; and a torsion bar portion between the arm portions is assembled to an axle. The cylinder body of the oil-hydraulic cylinder is assembled to the frame, and the lever is assembled to the frame via a rotation fulcrum provided at an intermediate portion of the lever.

In the vehicle suspension apparatus disclosed in the publication, when the left and right wheels move vertically in the same direction (in the same phase) with extension and contraction of the oil-hydraulic cylinder being prohibited, the stabilizer bar is not twisted. When the left and right wheels move vertically in opposite directions (in opposite phases) with extension and contraction of the oil-hydraulic cylinder being prohibited, the stabilizer bar is twisted.

Meanwhile, when the left and right wheels move vertically in the same phase with extension and contraction of the oil-hydraulic cylinder being permitted, as in the case where extension and contraction of the oil-hydraulic cylinder are prohibited, the stabilizer bar is not twisted. When the left and right wheels move vertically in opposite phases with extension and contraction of the oil-hydraulic cylinder being permitted, unlike the case where extension and contraction of the oil-hydraulic cylinder are prohibited, the stabilizer bar is not twisted because of extension and contraction of the oil-hydraulic cylinder.

Incidentally, in the vehicle suspension apparatus disclosed in the publication, the stroke of the piston rod in the state in which the oil-hydraulic cylinder can extend and contract can be made smaller than that of the corresponding arm portion, by properly setting the rotation fulcrum of the lever. This configuration reduces the size of the oil-hydraulic cylinder and the space occupied thereby. However, in the case where the rotation fulcrum of the lever is set as described above, when the oil-hydraulic cylinder cannot extend and contract, the force acting on the piston rod increases in accordance with the lever ratio, whereby excessively large load is imposed on the frame to which the oil-hydraulic cylinder is assembled.

SUMMARY OF THE INVENTION

In view of the foregoing, an object of the present invention is to provide a vehicle suspension apparatus in which a large stroke of an arm portion of a stabilizer bar is attained through a small stroke of the piston rod of a hydraulic cylinder and in which excessively large load does not act on a portion to which the hydraulic cylinder is assembled.

In order to achieve the above object, the present invention provides a vehicle suspension apparatus comprising a stabilizer bar including a torsion bar portion and two arm portions extending from opposite ends of the torsion bar portion; a hydraulic cylinder including a cylinder body, a piston, and a piston rod; and a lever for connecting one of the arm portions to the piston rod of the hydraulic cylinder, wherein a rotation fulcrum of the lever is set such that a stroke of the piston rod becomes smaller than that of the one arm portion, and the rotation fulcrum of the lever is connected to the cylinder body of the hydraulic cylinder via a link.

In this case, the vehicle suspension apparatus may be configured such that the one arm portion of the stabilizer bar to which the lever is connected is mounted to the vehicle body via the hydraulic cylinder, the other arm portion of the stabilizer bar is mounted to the vehicle body via a stabilizer link, the torsion bar portion of the stabilizer bar is mounted to an axle, and the cylinder body of the hydraulic cylinder is assembled to the vehicle body.

In the vehicle suspension apparatus, for example, when the left and right wheels move vertically in the same phase with extension and contraction of the hydraulic cylinder being prohibited, the stabilizer bar is not twisted. When the left and right wheels move vertically in opposite phases with extension and contraction of the hydraulic cylinder being prohibited, the stabilizer bar is twisted.

Meanwhile, when the left and right wheels move vertically in the same phase with extension and contraction of the hydraulic cylinder being permitted, as in the case where the extension and contraction of the hydraulic cylinder are prohibited, the stabilizer bar is not twisted. When the left and right wheels move vertically in opposite phases with extension and contraction of the hydraulic cylinder being permitted, unlike the case where the hydraulic cylinder cannot extend and contract, the one arm portion of the stabilizer and the lever rotate about the rotation fulcrum of the lever while extending and contracting the hydraulic cylinder. Therefore, the stabilizer bar is not twisted.

In the vehicle suspension apparatus of the present invention, the rotation fulcrum of the lever is set such that the stroke of the piston rod in a state where the hydraulic cylinder can extend and contract becomes smaller than that of the one arm portion. Therefore, a large stroke of the arm portion can be attained by means of a small stroke of the piston rod, whereby the size of the hydraulic cylinder can be reduced, and the space occupied by the hydraulic cylinder can be reduced.

Incidentally, in the vehicle suspension apparatus of the present invention, the rotation fulcrum of the lever is connected to the cylinder body of the hydraulic cylinder via the link. Accordingly, in a state in which the hydraulic cylinder cannot extend and contract, a large input acts on the piston rod in accordance with the lever ratio; however, another input acts on the link via the rotation fulcrum of the lever in a direction such that the second input cancels the input acting on the piston rod. That is, the force transmitted to the cylinder body via the piston rod and the force transmitted to the cylinder body via the link, which serve as internal forces within the cylinder body, cancel each other out almost completely. Thus, a portion to which the cylinder body is assembled; e.g., the frame, which is a portion of the vehicle body, receives only a force which is equal in magnitude to the input acting on the one arm portion. Therefore, excessively large load does not act on the portion to which the hydraulic cylinder is assembled.

When the present invention is embodied, the intersection between a straight line which passes through a connection point between the lever and the one arm portion and a connection point between the cylinder body and the vehicle body and a straight line which passes through a connection point between the lever and the link and a connection point between the cylinder body and the link may be set to be located in the vicinity of the axis of the piston rod.

In this case, not only forces in directions parallel to the axis of the piston rod, but also forces whose directions are generally perpendicular to the axis of the piston rod and which cancel each other act on the connection point between the lever and the one arm portion and the connection point between the lever and the link. Therefore, only a force whose direction generally coincides with the axis of the piston rod acts on the connection point between the lever and the piston rod. Therefore, although a large input acts on the piston rod, bending force hardly acts on the piston rod, so that the durability of the piston rod is enhanced. Further, since the sliding resistance between the cylinder body and the piston rod is prevented from increasing, the durability of components of the oil-hydraulic cylinder is also enhanced.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
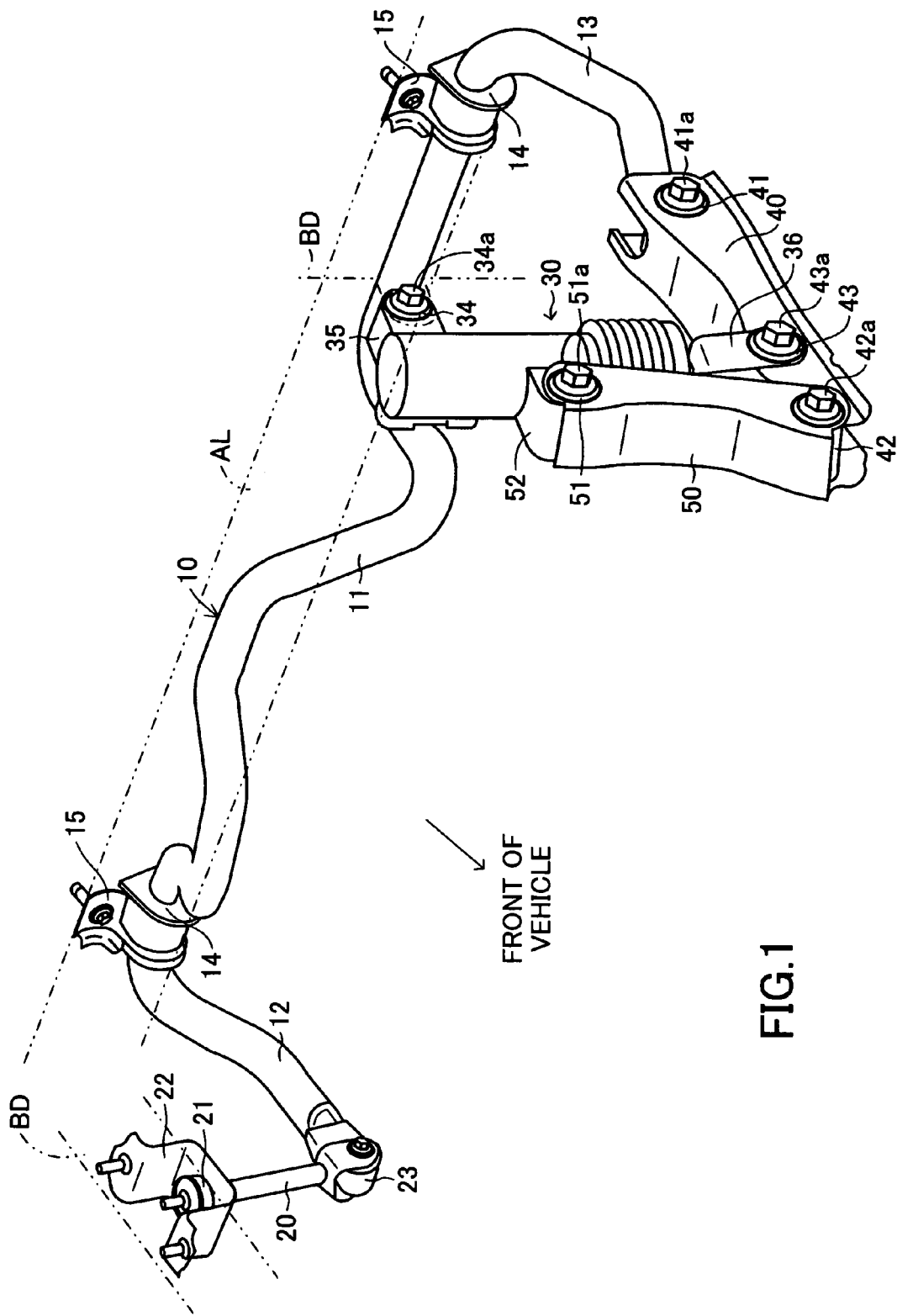
FIG. 1 is a schematic view showing a rear wheel side of a vehicle suspension apparatus according to one embodiment of the present invention.

One embodiment of the present invention will be described with reference to the drawings. FIG. 1 schematically shows a rear wheel side of a vehicle suspension apparatus according to the embodiment of the present invention. The vehicle suspension apparatus includes a stabilizer bar 10, a right stabilizer link 20, an oil-hydraulic cylinder (hydraulic cylinder) 30, a lever 40, and a link 50. In the present embodiment, since the front wheel side is configured in the same manner as the rear wheel side, only the rear wheel side will be described, and description of the front wheel side is omitted.

The stabilizer bar 10 is formed to have a generally squarish-C-shape as viewed from above, and includes a torsion bar portion 11, a right arm portion 12, and a left arm portion 13. The torsion bar portion 11 extends in the lateral direction of the vehicle, and is assembled at the vicinities of the left and right ends to an axle AL via rubber bushings 14 and brackets 15.

The right arm portion 12 extends from the right end of the torsion bar portion 11 toward the front of the vehicle, and is connected at its front end to a frame, which is a portion of a vehicle body BD, via the right stabilizer link 20. The left arm portion 13 extends from the left end of the torsion bar portion 11 toward the front of the vehicle, and is connected at its front end to the frame, which is a portion of the vehicle body BD, via the hydraulic cylinder 30 and the lever 40.

The right stabilizer link 20 is connected at its upper end to the frame, which is a portion of the vehicle body BD, via a rubber bushing 21 and a bracket 22, and supports at its lower end the right arm portion 12 via a rubber bushing 23 such that the right arm portion 12 is rotatable about an axis extending in the lateral direction of the vehicle.

Figure 2:
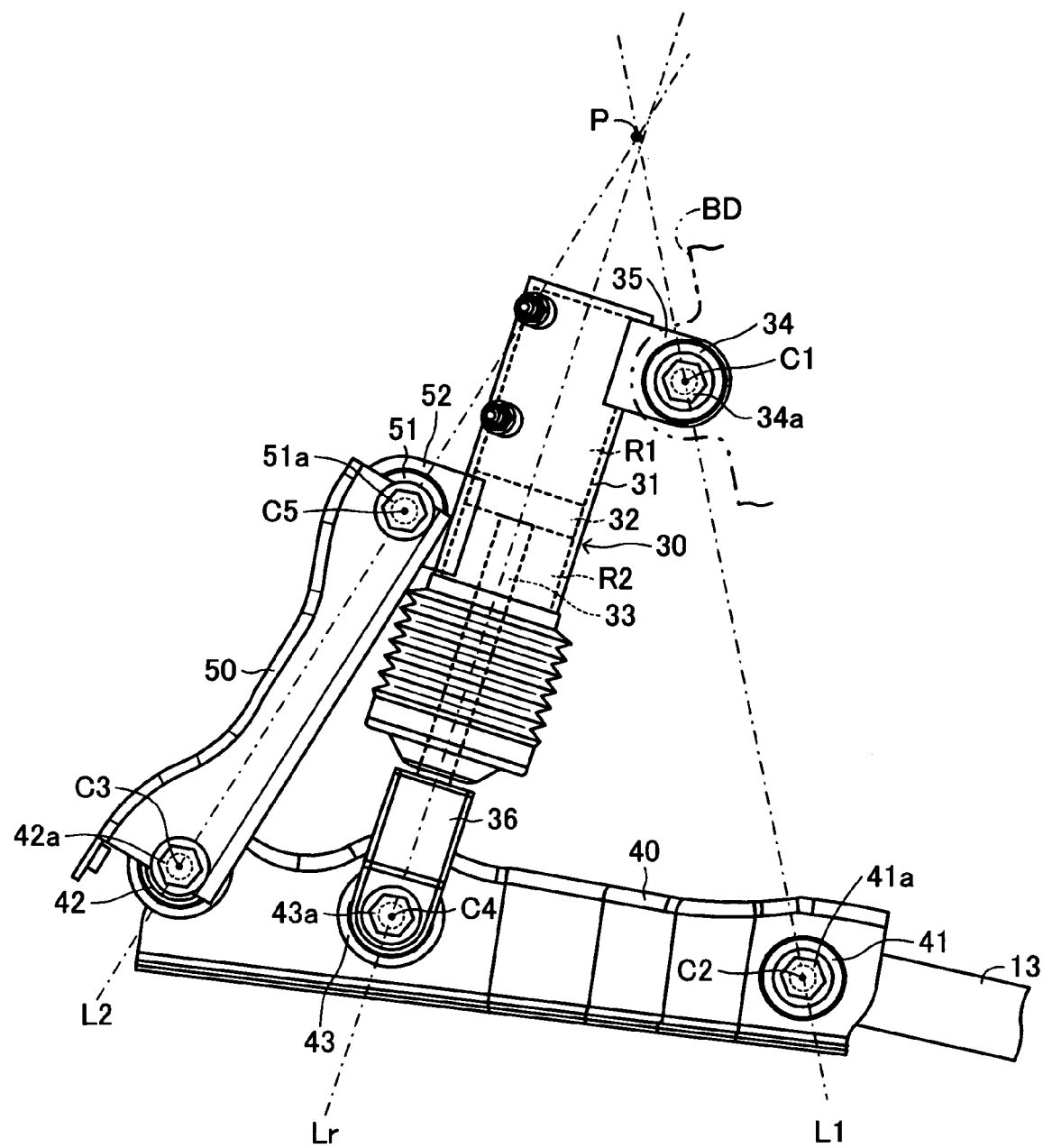
FIG. 2 is an enlarged side view of a main portion of the vehicle suspension apparatus shown in FIG. 1.

As shown in FIGS. 1 and 2, the oil-hydraulic cylinder 30 is disposed to extend vertically, and includes a cylinder body 31, a piston 32, and a piston rod 33. The cylinder body 31 is connected, at the periphery of its upper end portion, to the frame, which is a portion of the vehicle body BD, via a rubber bushing 34, a bolt 34a, and a bracket 35 in such a manner that the cylinder body 31 can rotate about the center axis of the rubber bushing 34. The rubber bushing 34 is disposed such that its center axis extends in the lateral direction of the vehicle. The center axis of the rubber bushing 34 is represented as a connection point C1 in the side view of FIG. 2.

The piston 32 is fluid-tightly and slidably assembled into the cylinder body 31, and divides the interior of the cylinder body 31 into an upper chamber R1 and a lower chamber R2. The upper and lower chambers R1 and R2 of the oil-hydraulic cylinder 30 are connected to the upper and lower chambers of a front-wheel-side oil-hydraulic cylinder via unillustrated passages and an unillustrated hydraulic control circuit. The upper end of the piston rod 33 is secured to the lower end of the piston 32, and fluid-tightly projects from the bottom wall of the cylinder body 31. The lower end of the piston rod 33 is connected to the lever 40 via a bracket 36.

The lever 40 is formed to have a generally squarish-C-shaped transverse cross section, and is disposed in such a manner that its longitudinal direction becomes parallel to the fore-aft direction of the vehicle. The rear end of the lever 40 is connected to the front end of the left arm portion 13 via a rubber bushing 41 and a bolt 41a such that the lever 40 can rotate about the center axis of the rubber bushing 41. The rubber bushing 41 is disposed such that its center axis extends in the lateral direction of the vehicle. The center axis of the rubber bushing 41 is represented as a connection point C2 in the side view of FIG. 2.

The front end of the lever 40 is connected to the lower end of the link 50 via a rubber bushing 42 and a bolt 42a such that the lever 40 can rotate about the center axis of the rubber bushing 42. The rubber bushing 42 is disposed such that its center axis extends in the lateral direction of the vehicle. The center axis of the rubber bushing 42 is represented as a connection point C3 in the side view of FIG. 2.

Further, the lever 40 is connected to the piston rod 33 at its intermediate portion; i.e., at a point between the connection points C2 and C3, via a rubber bushing 43, a bolt 43a, and the bracket 36 such that the lever 40 can rotate about the center axis of the rubber bushing 43. The rubber bushing 43 is disposed such that its center axis extends in the lateral direction of the vehicle. The center axis of the rubber bushing 43 is represented as a connection point C4 in the side view of FIG. 2.

The link 50 is formed to have a generally squarish-C-shaped transverse cross section, and is disposed in such a manner that its longitudinal direction becomes parallel to the upper-lower direction of the vehicle. The upper end of the link 50 is connected to the periphery of an intermediate portion of the cylinder body 31 via a rubber bushing 51, a bolt 51a, and a bracket 52 such that the link 50 can rotate about the center axis of the rubber bushing 51. The rubber bushing 51 is disposed such that its center axis extends in the lateral direction of the vehicle. The center axis of the rubber bushing 51 is represented as a connection point C5 in the side view of FIG. 2.

The suspension apparatus is configured in such a manner that the direction of input transmitted from the left arm portion 13 of the stabilizer bar 10 to the lever 40 via the connection point C2 generally coincides with the direction of a straight line L1 passing through the connection points C1 and C2, and that the intersection P between the straight line L1 and a straight line L2 passing through the connection points C3 and C5 is located in the vicinity of the axis Lr of the piston rod 33 extending between the lines L1 and L2. Specifically, the offset of the intersection P from the axis Lr of the piston rod 33 is set to fall within the range of about 4% of the length of the piston rod 33 (the offset at which the buckling load and the bending fatigue limit associated with the piston rod 33 become approximately equal to each other).

In the present embodiment configured as described above, when the left and right wheels move vertically in the same phase with extension and contraction of the oil-hydraulic cylinder 30 being prohibited, the right arm portion 12 rotates about the center axis of the rubber bushing 23, and the left arm portion 13 rotates about the center axis of the rubber bushing 41. As a result, the right arm portion 12, the left arm portion 13, and the torsion bar portion 11 rotate together. Therefore, in this case, the stabilizer bar 10 is not twisted.

When the left and right wheels move vertically in opposite phases with extension and contraction of the oil-hydraulic cylinder 30 being prohibited, the right arm portion 12 and the left arm portion 13 rotate about the axis of the torsion bar portion 11 in opposite directions. Therefore, in this case, the stabilizer bar 10 is twisted. Notably, even when only one of the left and right wheels moves vertically with extension and contraction of the oil-hydraulic cylinder 30 being prohibited, the stabilizer bar 10 is twisted as in the above-described case.

Meanwhile, when the left and right wheels move vertically in the same phase with extension and contraction of the oil-hydraulic cylinder 30 being permitted, as in the case where extension and contraction of the oil-hydraulic cylinder 30 are prohibited, the stabilizer bar 10 is not twisted.

Further, when the left and right wheels move vertically in opposite phases with extension and contraction of the oil-hydraulic cylinder 30 being permitted, unlike the case where the extension and contraction of the oil-hydraulic cylinder 30 are prohibited, the left arm portion 13 and the lever 40 rotate about the connection point C3, while extending or contracting the piston rod 33 of the oil-hydraulic cylinder 30. At this time, the link 50 rotates about the connection point C5 with extension and contraction of the piston rod 33. Therefore, in this case, the stabilizer bar 10 is not twisted, because of extension and contraction of the oil-hydraulic cylinder 30. Notably, even when only one of the left and right wheels moves vertically with extension and contraction of the oil-hydraulic cylinder 30 being permitted, the stabilizer bar 10 is not twisted as in the above-described case.

In the present embodiment, the connection point C3; i.e., the rotation fulcrum of the lever 40, is set such that the stroke of the piston rod 33 in a state where the oil-hydraulic cylinder 30 can extend and contract becomes smaller than that of the left arm portion 13. Therefore, a large stroke of the left arm portion 13 can be attained by means of a small stroke of the piston rod 33, whereby the size of the oil-hydraulic cylinder 30 can be reduced, and the space occupied by the oil-hydraulic cylinder 30 can be reduced.

Incidentally, in the present embodiment, the connection point C3 is connected to the cylinder body 31 of the oil-hydraulic cylinder 30 via the link 50. Accordingly, in a state in which the oil-hydraulic cylinder 30 cannot extend and contract, a large input acts on the piston rod 33 in accordance with the lever ratio; however, another input acts on the link 50 via the connection point C3 in a direction such that the second input cancels the input acting on the piston rod 33.

That is, the force transmitted to the cylinder body 31 via the piston rod 33 and the force transmitted to the cylinder body 31 via the link 50, which serve as internal forces within the cylinder body 31, cancel each other out almost completely. Thus, the frame to which the cylinder body 31 is assembled receives only a force which is equal in magnitude to the input acting on the left arm portion 13. Therefore, excessively large load does not act on the frame to which the oil-hydraulic cylinder 30 is assembled.

In the present embodiment, the intersection P between the straight line L1, which passes through the connection points C1 and C2, and the straight line L2, which passes through the connection points C3 and C5, is located in the vicinity of the axis Lr of the piston rod 33. Therefore, not only forces in directions parallel to the axis Lr of the piston rod 33, but also forces whose directions are generally perpendicular to the axis Lr of the piston rod 33 and which cancel each other act on the connection point C2 between the lever 40 and the left arm portion 13 and the connection point C3 between the lever 40 and the link 50. Therefore, only a force whose direction generally coincides with the axis Lr of the piston rod 33 acts on the connection point C4 between the lever 40 and the piston rod 33.

By virtue of the above-described configuration, although a large input acts on the piston rod 33, bending force hardly acts on the piston rod 33, so that the durability of the piston rod 33 is enhanced. Further, since the sliding resistance between the cylinder body 31 and the piston rod 33 is prevented from increasing, the durability of components of the oil-hydraulic cylinder 30 is also enhanced.

In the present embodiment, the bracket 35 used for attaching the cylinder body 31 to the frame, which is a portion of the vehicle body BD, is provided on the outer periphery of the upper end of the cylinder body 31. Therefore, the space occupied by the oil-hydraulic cylinder 30 as measured in the vertical direction can be secured more easily.

In the present embodiment, the connection point C4 between the lever 40 and the piston rod 33 is provided between the connection point C2 between the lever 40 and the left arm portion 13 and the connection point C3 between the lever 40 and the link 50. However, the connection point C3 between the lever 40 and the link 50 may be provided between the connection point C2 between the lever 40 and the left arm portion 13 and the connection point C4 between the lever 40 and the piston rod 33, insofar as the connection point C3, which serves as the rotation fulcrum of the lever, is set such that the stoke of the piston rod 33 becomes smaller than that of the left arm portion 13.

In the above-described embodiment, the oil-hydraulic cylinder 30 is disposed to extend in the upper-lower direction of the vehicle, and the lever 40, which is connected to the piston rod 33, is disposed such that its longitudinal direction becomes parallel to the fore-aft direction of the vehicle. However, the present invention can be applied to the above-described conventional vehicle suspension apparatus or a similar vehicle suspension apparatus in which an oil-hydraulic cylinder is disposed to extend in the fore-aft direction of the vehicle, and a lever connected to the oil-hydraulic cylinder is formed into a crank shape in side view, insofar as the rotation fulcrum of the lever is connected to the hydraulic cylinder via a link.

In the above-described embodiment, the present invention is applied to a vehicle suspension apparatus of a type in which the stabilizer bar 10 is assembled to the axle AL at the torsion bar portion 11, and is assembled to the frame, which is a portion of the vehicle body BD, at the left arm portion 13 via the oil-hydraulic cylinder 30. However, the present invention can be applied to a vehicle suspension apparatus of a type in which a torsion bar portion of a stabilizer bar is assembled to the frame, which is a portion of the vehicle body, such that the stabilizer bar can rotate about the axis of the torsion bar portion, and one of arm portions of the stabilizer bar is assembled to a wheel support member, such as a strut, via an oil-hydraulic cylinder.

What is claimed is:

1. A suspension apparatus for a vehicle comprising:
   a stabilizer bar including a torsion bar portion and two arm portions extending from opposite ends of the torsion bar portion;
   a hydraulic cylinder including a cylinder body, a piston, and a piston rod;
   a lever for connecting one of the arm portions to the piston rod of the hydraulic cylinder;
   a separate connector articulatedly connecting the lever to the cylinder body, and wherein a connection point between the lever and the separate connector forms a rotation fulcrum of the lever;
   wherein the rotation fulcrum of the lever is set such that a stroke of the piston rod is smaller than that of the one arm portion; and
   wherein a connection point between the one arm portion and the lever is a first connection point, wherein a connection point between the piston rod and the lever is a second connection point, and wherein said connection point between said separate connector and said lever is a third connection point, and further wherein said second connection point is between said first connection point and said third connection point.

2. A suspension apparatus for a vehicle according to claim 1, wherein the one arm portion of the stabilizer bar to which the lever is connected is mounted to a vehicle body via the hydraulic cylinder, the other arm portion of the stabilizer bar is mounted to the vehicle body via a stabilizer link, the torsion bar portion of the stabilizer bar is mounted to an axle, and the cylinder body of the hydraulic cylinder is assembled to the vehicle body.

3. A suspension apparatus for a vehicle according to claim 2, wherein the intersection between a straight line which passes through a connection point between the lever and the one arm portion and a connection point between the cylinder body and the vehicle body and a straight line which passes through the connection point between the lever and the separate connector and a connection point between the cylinder body and the separate connector is set to be located in the vicinity of an axis of the piston rod.

4. A suspension apparatus according to claim 1, wherein upon movement of said one arm portion, an amount of movement of said second connection point is less than an amount of movement of said first connection point.

5. A suspension apparatus according to claim 4, wherein a distance between said second connection point and said third connection point is smaller than a distance between said second connection pint and said first connection point.

6. A suspension apparatus according to claim 1, wherein a distance between said second connection point and said third connection point is smaller than a distance between said second connection pint and said first connection point.

7. A suspension apparatus according to claim 1, wherein a bracket extends from a cylindrical periphery of the cylinder body, and wherein the cylinder body is mounted to the vehicle via said bracket, and wherein said one arm portion of the stabilizer bar is mounted to the vehicle via the hydraulic cylinder and said bracket.

8. A suspension apparatus according to claim 1, wherein a bracket extends from a cylindrical periphery of the cylinder body, and wherein the cylinder body is mounted to the vehicle via said bracket, and wherein said one arm portion of the stabilizer bar is mounted to the vehicle via the hydraulic cylinder and said bracket.

9. A suspension apparatus for a vehicle comprising:
   a stabilizer bar including a torsion bar portion and two arm portions extending from opposite ends of said torsion bar portion;
   a lever connected to one of the arm portions at a first connection point on said lever;
   a hydraulic cylinder including a cylinder body, a piston, and a piston rod, wherein the piston rod is connected to said lever at a second connection point on said lever;
   a separate connector connecting said lever to said cylinder body, wherein said separate connector is connected to said lever at a third connection point on said lever; and
   wherein said second connection point is positioned between said first connection point and said third connection point.

10. A suspension apparatus according to claim 9, wherein upon movement of said one arm portion, an amount of movement of said second connection point is less than an amount of movement of said first connection point.

11. A suspension apparatus according to claim 10, wherein a distance between said second connection point and said third connection point is smaller than a distance between said second connection point and said first connection point.

12. A suspension apparatus according to claim 9, wherein a bracket extends from a cylindrical periphery of the cylinder body, and wherein the cylinder body is mounted to the vehicle via said bracket, and wherein said one arm portion of the stabilizer bar is mounted to the vehicle via the hydraulic cylinder and said bracket.

13. A suspension apparatus according to claim 9, wherein an intersection between a straight line which passes through the first connection point and a connection point between the cylinder body and the vehicle and a straight line which passes through the third connection point and a connection point between the separate connector and the cylinder body is located in the vicinity of an axis of the piston rod.

* * * * *